June 28, 1955   P. F. STRUBEL   2,712,119
STRAIN RELIEF FOR ELECTRIC CORD
Filed Oct. 29, 1952
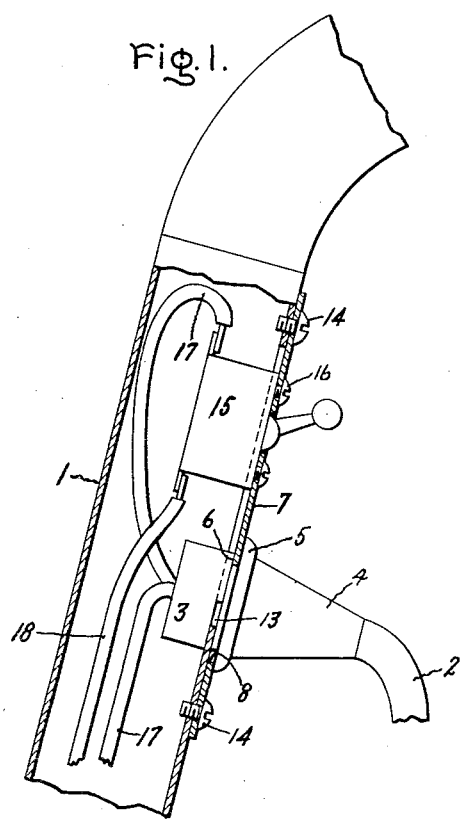
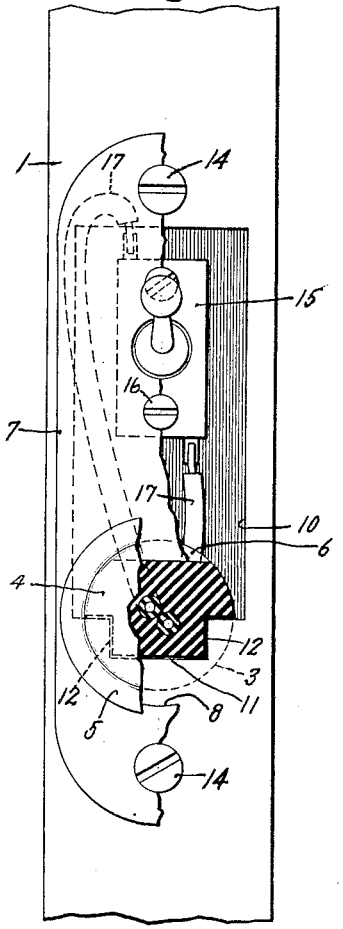
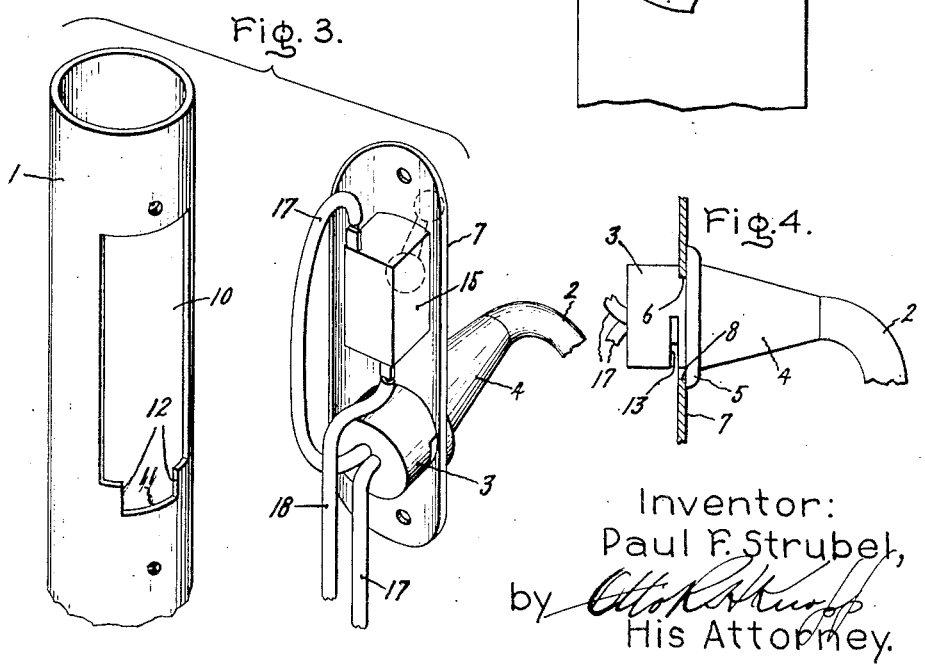
Inventor:
Paul F. Strubel,
by
His Attorney.

2,712,119

STRAIN RELIEF FOR ELECTRIC CORD

Paul F. Strubel, Milford, Conn., assignor to General Electric Company, a corporation of New York Application October 29, 1952, Serial No. 317,385

8 Claims. (Cl. 339—103)

---

In connection with electrical apparatus wherein an electric cord passes through an opening in a wall such as the wall of a tube or a casing, for example, and is electrically connected to terminals inside the wall, it is known to provide between the cord and wall means for anchoring the cord so that a pull on it will be taken by the wall and not transmitted to the terminal connection. My invention relates to such anchoring means, termed usually a strain relief, and has for its object to provide an improved strain relief which is simple in structure, capable of being manufactured at low cost, and easily assembled by relatively unskilled labor, but which, at the same time, functions in a satisfactory manner.

For a consideration of what I believe to be novel and my invention, attention is directed to the following specification and to the claims appended thereto.

According to the invention, the end of an electric cord is provided with a head to which is attached an anchoring plate by means of a slot in the head in which is positioned the edge of an opening in the anchoring plate through which the head projects, and the head and anchoring plate are attached to a wall with the head projecting through an opening in the wall, by a second slot in the head in which is positioned the edge of the wall opening and by screws or the like which fasten the anchoring plate to the wall.

My invention is well adapted for use in anchoring an electric cord to the tubular handle of a vacuum cleaner, and it is in connection with a vacuum cleaner handle that the invention is illustrated. However, it is to be understood that this is only by way of example and that my improved anchoring means may be used wherever found applicable.

In the drawing,

Fig. 1 is a sectional view of a part of a tubular vacuum cleaner handle to which an electric cord is attached by strain relief means embodying the invention.

Fig. 2 is a face view, partly broken away and partly in section, of the structure shown in Fig. 1.

Fig. 3 is a perspective exposed view illustrating the construction.

Fig. 4 is a detailed side view, partly in section, of a part of the strain relief structure.

Referring to the drawing, 1 indicates the tubular handle of a vacuum cleaner, to the wall of which the end of an electric cord 2 is to be attached. Fixed on cord 2, which may be a two-conductor overall rubber-covered cord, adjacent to its end is an enlargement formed from rubber or other suitable flexible material, comprising a round head 3 and a tapered sleeve 4, there being a flange 5 which surrounds head 3 where it merges into sleeve 4. The enlargement may be molded directly onto the cord end, or it may be a separately molded part attached to the cord end by cement or other suitable means. On one side of head 3 adjacent to flange 5 is a transversely extending slot 5 of a width to receive in it the wall of an anchoring plate 7. The anchoring plate is provided with an opening 8 of a size to permit of head 3 being passed through it to bring flange 5 up against the plate so that the head and plate can be assembled by passing the head through the opening and then sliding it relatively to the plate to bring the plate at the edge of the opening into slot 6, as well shown in Fig. 4.

The wall of tubular handle 1 is provided with an opening 10 of a width to permit of the passage of head 3 through it, and at one edge is provided with a rectangular notch 11 which forms a pair of ears 12 at the one edge. Head 3 is provided on the side opposite the slot 6 with a second transversely extending slot 13 of a width equal the thickness of the wall of handle 1 and spaced from the adjacent surface of flange 5 by a distance equal to the thickness of anchoring plate 7. Slot 13 is shaped to receive ears 12 and the wall at the lower end of notch 11 as best shown in Figs. 1 and 2. Anchoring plate 7 is attached to the wall of handle 1 by screws 14.

In assembling the strain relief, head 3 is passed through opening 8 in anchoring plate 7 and the head and plate are then slid relatively to each other to bring the one edge of opening 8 into slot 6. This also bring flange 5 up tight against plate 7. Head 3, with plate 7 thereon, is then passed through opening 10 and the head and plate and the handle slid relatively to each other to bring ears 12 and the bottom edge of notch 11 into slot 13. Screws 14 are then put in to fasten the anchoring plate to the handle wall. When thus assembled, the head is firmly anchored to handle 1 and, by reason of the rectangular shape of notch 11, is held from turning relatively to the head. This latter is especially important in the application of my invention to a device such as a vacuum cleaner, for in the use of such a device the cord is continually flexed, twisted, and turned, as well as pulled. My improved anchoring means effectively withstands all such movements. The tapered sleeve 4 serves to prevent sharp bending of the cord directly adjacent to head 5.

In carrying out my invention in connection with a vacuum cleaner, plate 7 may serve also as a plate for carrying the electric switch for the vacuum cleaner, and in the drawing 15 indicates a tumbler-type switch attached to plate 7 by screws 16. The rounded head 3 of the strain relief and switch 15 may be both attached to another plate 7 and the electrical connections made to the switch before assembly in the handle 1. (The two wires of the cord are indicated at 17 and a motor lead is indicated at 18.) After the head and switch have been attached to the anchoring plate, the head and switch may be inserted through opening 10, the opening being long enough to permit of this, the anchoring plate slid down to bring ears 12 and the bottom wall of notch 11 into the groove 13, and then screw 14 put into place.

As pointed out above, the invention has the advantage that while firmly anchoring the cord end to the wall, it at the same time is capable of being provided at low cost. This is especially true in the case of a device such as a vacuum cleaner since the anchoring plate may comprise the plate which carries the switch so that use of the invention in such an application does not require the provision of a separate anchoring plate.

What I claim as new and desire to secure by Letters Patent of the United States is:

1. The combination with a wall having an opening therein of means for anchoring an electric cord end in the opening comprising a head on the cord end having opposite transversely extending slots therein, an anchoring plate having an aperture dimensioned to receive the said head with an edge of said aperture seated in one of the said slots of the head while an edge of the opening in said wall is seated in the other of said slots and separable fastening means for securing the said anchoring plate to the said wall.

2. The combination as defined by claim 1 wherein the head is provided with an annular flange which is positioned against the outer surface of the anchoring plate.

3. The combination as defined by claim 1 wherein there is attached to the anchoring plate an electric switch with which the cord is electrically connected.

4. Means for anchoring an electric cord end in an opening in a wall comprising a head on the cord end dimensioned to pass through said wall opening, said head having opposed transversely extending slots, and an anchoring plate attached to said head, said anchoring plate having an opening dimensioned to permit of the head being passed through it and being attached to the head by an edge of the opening positioned in one of said slots, whereby the anchoring means may be attached to said wall by passing the head through the wall opening, positioning an edge of the wall opening in said other slot and then fastening the anchoring plate to the wall.

5. Means for anchoring an electric cord end in an opening in a wall comprising a head on the cord end having a surrounding flange spaced from the end of the head and a transverse slot directly adjacent to said flange, and an anchoring plate having an opening dimensioned to permit of the head being passed therethrough, the anchoring plate being attached to the head with the flange in engagement with the anchoring plate by an edge of its opening being positioned in said slot, said head having a second transverse slot opposite the first-named slot which is spaced from said flange a distance equal to the width of said first-named slot, the opening in said wall being dimensioned to permit of the head being passed through it, whereby the anchoring means may be attached to said wall by passing the head through the wall opening, positioning an edge of the wall opening in said second slot and fastening the anchoring plate to the outside of said wall.

6. Strain relief means for an electric cord end comprising an anchoring plate having an opening therein, and a head on the cord end fastened in said opening, said head being dimensioned to permit of its being passed through the opening, the head having a transverse slot in which an edge of said opening is positioned, whereby the head may be fastened in the opening in the anchoring plate by passing the head through the opening and then moving the head with respect to the plate to bring an edge of the opening into said slot, said head being provided with a second transverse slot on its side opposite to the first-named slot, said second transverse slot being offset from the first slot by an amount equal to the thickness of said anchoring plate, said second-named slot being adapted for use in fastening the strain relief in an opening in a wall, and means for fastening the said anchoring plate to said wall.

7. The combination with a wall having an opening therein of means for anchoring an electric cord end in said opening comprising a head on the cord end having opposite transversely extending slots therein, an anchoring plate having an aperture dimensioned to receive the said head with an edge of said aperture seated in one of said slots of the head, one edge of the opening in the said wall being provided with a notch, the said notched edge of the wall opening extending into the other of said slots, the said last-mentioned slot being complemental to the said notched edge so as to restrict relative rotation between the head of the cord and the wall, and separable fastening means for securing the said anchoring plate to the said wall.

8. Means for anchoring an electric cord end in an opening in a wall comprising a head on the cord end having opposite transversely extending slots therein, an anchoring plate having an aperture dimensioned to receive the said head with an edge of said aperture seated in one of said slots of the head, the said opening in the wall also being dimensioned to receive the said head so that an edge of the wall opening is seated within the other of the said slots, and separable fastening means for securing the said anchoring plate to the said wall.

References Cited in the file of this patent

UNITED STATES PATENTS

| | | |
|---|---|---|
| 2,171,331 | Folsom | Aug. 29, 1939 |

FOREIGN PATENTS

| | | |
|---|---|---|
| 458,779 | Canada | Aug. 9, 1949 |